US005232510A

United States Patent [19]

Tilbey

[11] Patent Number: 5,232,510
[45] Date of Patent: Aug. 3, 1993

[54] SLITTING APPARATUS FOR SUGARCANE RIND

[76] Inventor: Sydney E. Tilbey, 989 Wagonwood Crescent, Victoria B.C., Canada, V8X 4M1

[21] Appl. No.: 807,996

[22] Filed: Dec. 16, 1991

Related U.S. Application Data

[63] Continuation-in-part of Ser. No. 637,494, Jan. 4, 1991, Pat. No. 5,096,499.

[51] Int. Cl.[5] .......................... B01J 3/00; A47J 17/18

[52] U.S. Cl. ........................................ 127/2; 241/166; 241/167

[58] Field of Search ........................ 241/166, 167, 236; 127/2

[56] References Cited

U.S. PATENT DOCUMENTS 1,980,193 11/1934 Finegan .............................. 241/167
3,797,765 3/1974 Samuels .............................. 241/236
4,489,897 12/1984 Turner et al. ...................... 241/167
4,529,134 7/1985 Williams ............................. 241/236
4,669,673 6/1987 Lodovico et al. .................. 241/166
5,062,576 11/1991 Burda ................................. 241/236
5,096,499 3/1992 Tilby ...................................... 127/2

*Primary Examiner*—Theodore Morris
*Assistant Examiner*—Patricia L. Hailey
*Attorney, Agent, or Firm*—Jansson & Shupe, Ltd.

[57] ABSTRACT

A sugarcane rind-slitting apparatus having a pair of counter-rotatable cylindrical assemblies each with a multiplicity of axially-adjustable intermeshing disks and flexible spacers, and fixed comb members between disks to guide the rind and rind strands to facilitate passage of rind and rind strands. Certain preferred embodiments include axial recesses on the sides of the disks near their peripheries to provide other advantages, including self-sharpening.

10 Claims, 5 Drawing Sheets

SLITTING APPARATUS FOR SUGARCANE RIND

RELATED APPLICATION

This is a continuation-in-part of U.S. patent application Ser. No. 07/637,494, entitled "Improved Slitting Apparatus for Sugarcane Rind," filed Jan. 4, 1991, by the inventor named herein, now U.S. Pat. No. 5,096,499.

FIELD OF THE INVENTION

This invention is related generally to apparatus for processing the rinds of sugarcane, sweet sorghum and the like and, more particularly, to apparatus for slitting the rinds.

BACKGROUND OF THE INVENTION

General Background

The stalk of the sugarcane plant includes an outer rind which is a hard, wood-like fibrous substance. The rind surrounds a central core of pith, which bears nearly all of the sugar juice from which various sugar products are made. The outer surface of the rind has a thin, waxy epidermal layer, referred to herein as "dermax."

Conventional sugarcane industry practices until today have utilized sugarcane primarily only for its sugar content. Such industry practices have involved chopping and crushing sugarcane stalks to remove the sugar juice, with the waste solids (bagasse) being used primarily only as fuel, mainly in sugar production operations.

Although such practices have been virtually uniform throughout the industry, it has been recognized that a number of very useful products may be produced from sugarcane if the sugarcane stalk is first separated into its rind, pith and dermax constituents. The many useful end-products made possible by such separation can provide great economic benefit. Such separation also provides significant efficiencies in the production of sugar.

Even though stalk separation efforts began as early as the late 1800's, essentially the entire sugarcane industry continued in the conventional process noted above, involving chopping and crushing of the whole stalk to extract sugar juice.

Technology in this field remained rather dormant until the 1960's, when a resurgence of development activity began, substantially all related to what has been known in the industry as the Tilby system, a cane separation system named after the principal originator, Sydney E. ("Ted") Tilby.

Broadly speaking, the Tilby system includes a multistep operation executed by various portions of a cane separator machine. Sugarcane billets, i.e., cut lengths of cane stalk preferably about 25-35 cm long, are driven downwardly over a splitter to divide them lengthwise into semi-cylindrical half-billets. The two half-billets of a split billet are then processed individually by symmetrical downstream portions of the separator machine.

The first of such downstream portions of the separator is a depithing station which includes a cutter roll and holdback roll for milling pith away from the rind of the half-billet while simultaneously flattening the rind. The next downstream portion is a dermax removal station from which the rind emerges ready for subsequent processing in a variety of ways, including slitting, chipping and/or many other processing steps.

The Tilby system, when finally fully commercialized, can provide substantial outputs of several high-value products. This greatly increases cash yields per ton of sugarcane, a factor of significant importance to an industry in which profitability in recent years has been marginal at best. This is important generally, but is of particular importance to the many developing countries in which a flourishing sugarcane industry would be a boon to economic growth and stability.

Considering that sugarcane is one of the most rapidly growing, easily developed, and readily accessible sources of biomass, full commercialization of the Tilby system can significantly reduce dependence on forests and on certain other crops and resources. Among the products which can be made from sugarcane constituents separated by the Tilby system are a variety of wood products and building materials.

While substantial technical development has occurred over a period of many years with respect to the Tilby system, a number of difficult and critical problems have remained. The failure to overcome such problems has prevented full commercialization of the Tilby system. The invention described and claimed herein is directed to the solution of certain of these problems.

SPECIFIC BACKGROUND

Full commercialization of the Tilby system depends, in part, on utilization of the large volume of sugarcane rind left after removal of pith. In order for the rind to be used to produce high-value wood products and building materials, it is necessary that it be processed in a way which takes advantage of its natural fiber strength. It has been found that rind from sugarcane half billets which are slit longitudinally into narrow strips of fiber-bundle strands has great utility, for example, in production of structural panels. Tensile fiber strength is retained and can be fully utilized.

Early attempts to slit sugarcane rind involved the use of an apparatus referred to in the prior art as a reel shredder, an example of which is seen in U.S. Pat. No. 3,567,511 (Tilby). Rind was shredded longitudinally as it was driven through a pair of counter-rotatable cylindrical members having a multiplicity of intermeshing spaced annular projections (or disks). Individual strands (fiber bundles) were spread apart by the compressive mechanical shearing action of such intermeshing annular projections.

While such devices of the prior art were able to function, the prior art has associated with it a number of significant problems and deficiencies. Most are related to constricted flow of rind into the slitting apparatus, and result from the general configuration of the slitter apparatus.

One major problem is that the intermeshing annular projections (or disks) of the prior art become dull quickly, after very little use. Typically, the disks of each set have a constant axial dimension across their diameter. One set is precisely intermeshed with another for the purpose of cleanly slitting the rind. Wear results in incomplete and inefficient slitting, which hinders movement of the rind through the slitter apparatus. Worn projections (disks) also tend to tear the rind fibers, reducing their tensile strength and adversely affecting the quality of any subsequent rind product.

Another related concern is that disks are often irreparably damaged by shearing forces created by rind moving through the slitter apparatus in a misaligned fashion. The rigid mounting arrangements for intermeshing disks of the prior art tended to cause damage to the disks under pressure of this sort.

Another related concern is the high cost of slitter apparatus of the prior art. The high level of precision needed for proper operation requires time-consuming skilled labor. But, regardless of cost, precision is quickly lost as the disks become dull, and this leads to a need for replacement or additional machining.

Another significant problem is that sugarcane rind often plugs the slitting apparatus. The intermeshing disks of certain prior art slitters do not always engage the rind properly; instead, disk edges slip on the rind, and this tends to reduce the throughput rate and lead to a buildup of unslit rind. This condition not only reduces efficiency, but can cause damage to the slitter apparatus.

In summary, a considerable number of drawbacks and problems exist in the prior art relating to sugarcane rind-slitting. There is a need for an improved rind slitter to more readily utilize the commercial potential of sugarcane rind and of the Tilby sugarcane separation system.

OBJECTS OF THE INVENTION

It is an object of this invention to provide an improved sugarcane rind-slitting apparatus overcoming some of the problems and shortcomings of the prior art.

Another object of this invention is to provide an improved apparatus for slitting sugarcane rinds which accepts and slits a high volume of rinds without jamming.

Another object of this invention is to provide an improved rind-slitting apparatus which avoids or minimizes a buildup of debris between the disks.

Another object of this invention is to provide a rind-slitting apparatus which maintains a high level of control of the in-flow of rind and out-flow of strands.

Another object of this invention is to provide an improved rind-slitting apparatus allowing quick adjustment for problems related to disk wear, without the need for costly replacement or extensive downtime of the separation system.

Another object of this invention is to provide a sugarcane rind-slitting apparatus which remains sharp over extended use.

Another object of this invention is to provide an improved slitter apparatus which slits sugarcane rinds and the like completely and efficiently in shorter periods of time.

Another object of this invention is to provide an improved slitting apparatus which does not require costly precision machining.

Another object of this invention is to provide an improved slitting apparatus which allows inexpensive replacement of components as necessary.

Another object of this invention is to provide a slitter with an improved disk attachment system which accommodates varying pressures without damage to disks.

These and other important objects will be apparent from the descriptions of this invention which follow.

SUMMARY OF THE INVENTION

This invention is an improved rind-slitting apparatus for use in sugarcane separation systems. The invention overcomes certain problems and deficiencies, including those outlined above.

This invention involves an improved intermeshing disk assembly. The inventive arrangement allows large volumes of sugarcane rind to be slit quickly and effectively, without excessive maintenance. The disks remain sharp over extended use to insure the rind is slit cleanly. Products derived therefrom gain full benefit of the inherent tensile strength of the rind fibers. Any disk wear may be compensated for by quick adjustment thereof along the shaft. Production proceeds efficiently and economically, without prolonged downtime for repair or replacement.

Each pair of counter-rotatable cylindrical assembly has a shaft and a multiplicity of disks along the shaft intermeshing with the disks of the other cylindrical assembly. Each disk, which has two sides and a periphery, is between and in face-to-face contact, along its sides near its periphery, with two adjacent disks of the other cylindrical assembly. Flexible spacers on each shaft are between the disks to space them, and each shaft has means on it to tighten the disks and flexible spacers in an axial direction along the shaft. This makes axial adjustment along the shafts possible. Fixed comb members, preferably made of a soft metal such as brass, extend between the rotating disks and perform various material-guiding functions.

Such fixed comb members have mounting portions by which they are secured to stationary members beside each of the cylindrical assemblies. For each individual disk on each shaft, a fixed comb member extends between the two adjacent disks on the other shaft and in alignment with the individual disk. Such comb member has a guide edge between the two disks in a position radially beyond and adjacent to the periphery of the individual disk. This guide edge, along with the periphery of the individual disk, forms a strand passageway between the two adjacent disks.

In preferred embodiments, each comb member extends from the stationary member to a comb inner edge which is between such two disks and adjacent to and partially around the shaft on which such two disks are mounted. Such inner edge faces away from the stationary member to leave one side of the cylindrical assembly open. This facilitates clearing of debris and introduction of fluids (air or water), as for cleaning.

Each comb member also preferably has a transverse edge extending from the comb inner edge radially outwardly at an off-radius angle in a manner forming an outwardly-directed ramp against which debris is driven by disk rotation. This facilitates automatic removal of debris from between such two disks during slitting operations.

Referring now to the flexible spacers between disks, each disk has an uncompressed axial dimension greater than the axial dimension of the periphery of the disk (of the other cylindrical assembly) which is received between the disks on either side of such spacer. The flexible spacers are preferably O-rings.

Each shaft is preferably splined all around and the disks on it are configured to mate with the splines. This resists a tendency of the disks to be cocked (bent off-plane). Preferably, there are at least four splines on each shaft and four mating tabs on each disk. In highly preferred embodiments, the periphery of the disks of both cylindrical assemblies are knurled to better grip and move sugarcane rind through the slitting apparatus.

The opposite sides of each of the disks preferably are axially recessed beginning at a radial position spaced from the periphery of the disk by a distance less than the radial extent of intermeshing overlap and extending radially inwardly at least to a position spaced from the periphery by a distance greater than the radial extent of intermeshing overlap. The axial dimension of such recessing is preferably substantially greater than the thickness of sugarcane rind, to facilitate clearing of slit rind from between the disks.

The disks, of course, are of hard metal and such hard metal forms such recessing. In certain highly preferred embodiments, the recessing is filled by a softer metal, which tends to prevent accumulation of debris.

The counter-rotating motion of one set of intermeshing disks through the other, and into the recesses on the other, helps to maintain disk the degree of disk sharpness necessary to slit the sugarcane rind cleanly and effectively over an extended period. The configuration of this invention provides self-sharpening.

Nonetheless, some wear is inevitable along the axial dimension of the disks. Disk-locator collars and lock nuts at both ends of each shaft work in conjunction with the flexible spacers between the disks to allow axial tightening of the disks. The spacers are compressible and allow the disks to be brought together by tightening the lock nut and collar combination to compensate for a small degree of disk wear.

Any slitting apparatus involving large volumes of sugarcane rind invariably experiences stress forces which tend to twist and cock the disks out of their planes of rotation about the shaft. This tends to cause breakage of components. Downtime for repair, of course, causes loss of production and increased cost. The configuration of this invention provides excellent pressure-absorption. The disks are relatively loosely mounted and flexible because of the flexible spacers and the spline mounting. The multiple disk tabs move enough in the shaft splines to avoid cocking of the disks. Forces such as the type described above are avoided or absorbed to the extent necessary to reduce the possibility of disk damage.

Disks of the present invention are cost-efficient. They are relatively inexpensive to make and easy to replace, if necessary, relative to the costly precision-machined disks of the prior art.

Sugarcane separation generates large volumes of rind. Economies of scale in rind processing require that the rind move through a slitting apparatus as quickly and effectively as possible. The slitting apparatus of this invention allows sugarcane rind to be slit quickly, efficiently, and in a manner such that optimal fiber strength is imparted to the products derived therefrom.

The slitting apparatus of this invention avoids the excessive wear and precision problems of the prior art. A longer effective apparatus lifetime without the minimal need for replacement or repair adds to the economy and commercialization potential of the entire separation process.

DETAILED DESCRIPTIONS OF PREFERRED EMBODIMENTS

Figure 1:
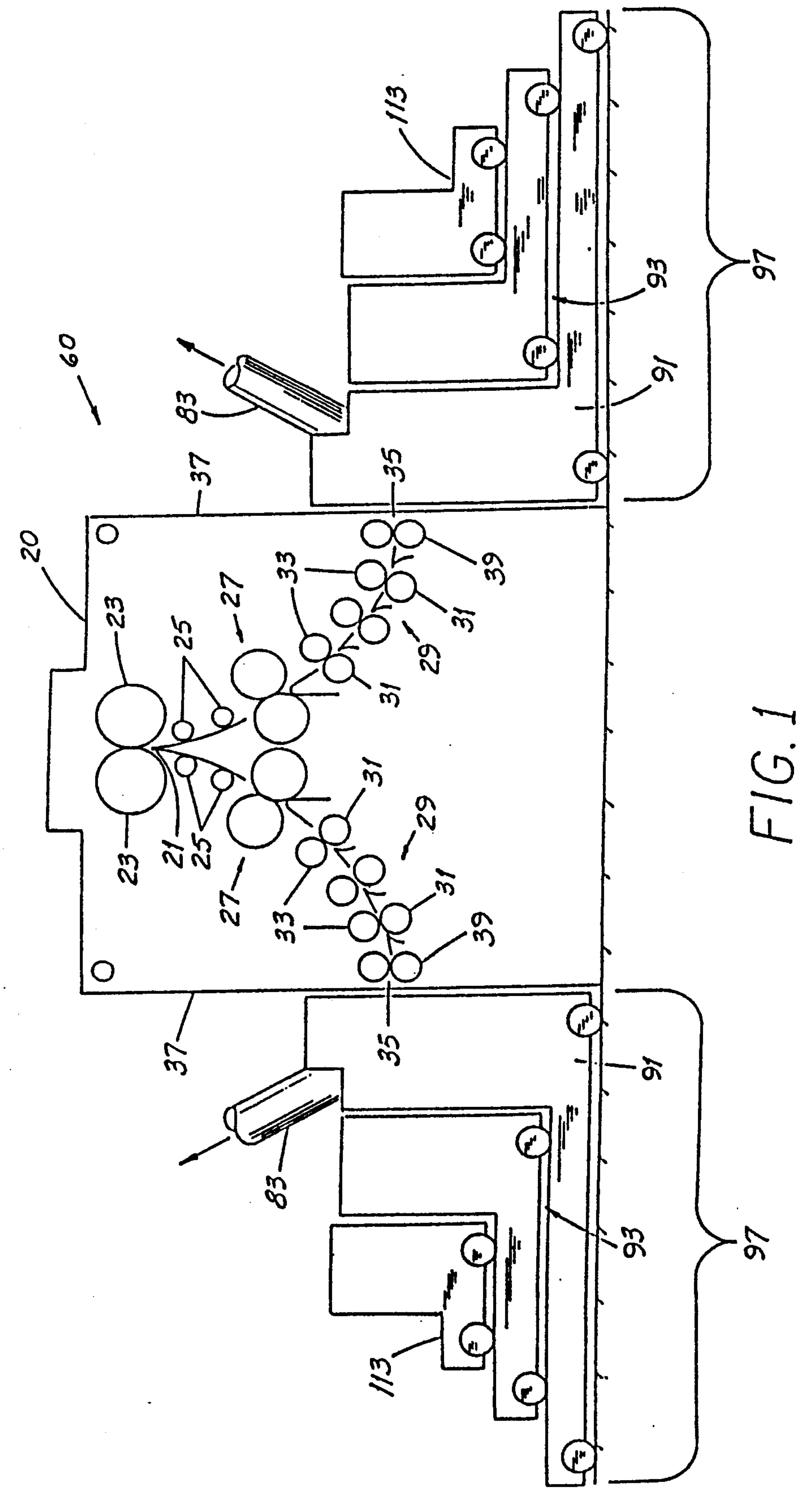
FIG. 1 is a schematic front elevation view indicating the location of the slitter apparatus of this invention in relationship to related components of a sugarcane separation system.

The figures show an improved sugarcane rind slitter apparatus 30. Slitter apparatus 30, as shown, is a part of a sugarcane separation line 60 which is illustrated in FIG. 1. Before turning to a description of the details of slitter apparatus 30 itself, it will be helpful to describe the separation line of which it is a part.

Separation line 60 includes a tower-like central unit 20 which is symmetrical in a "mirror-image" arrangement. Central unit 20 receives sugarcane stalk billets which are forced downwardly end-first onto a knife 21 by a pair of feed rolls 23, thereby splitting the billets longitudinally into half billets. The half billets, with the interior pith now exposed, are guided by rotating control brushes 25 into two depithing stations 27, one on either side of the unit 20. Each depithing station is followed by three dual-roll sets 29, each having brush and feed rolls 31 and 33, which serve a pith-diverting function. Fully depithed rind is then ejected from a port 35 at each wing 37 of the central unit 20 by a pair of rubber-clad grasping rolls 39.

FIG. 1 also shows two sets 97 of carriages which are positioned to receive and further process sugarcane rinds discharged from central unit 20. Each carriage set 97 has a primary carriage 91, a secondary carriage 93, and a tertiary carriage 113.

Each primary carriage 91 is adjacent to the central unit 20 and has a dermax-removing means which loosens the dermax and conveys it away through a tube 83. The output from the apparatus on primary carriage 91 is rind from which both pith and dermax have been removed.

Secondary carriage 93 carries slitter apparatus 30 of this invention, the details of which will hereafter be described by reference to FIGS. 2-5. Slitter apparatus 30 receives flattened rinds moving end-first in a generally horizontal direction. The output of the slitting operation may be removed for further processing, or may pass into the apparatus of tertiary carriage 113 for chipping or other treatment, depending on the intended end use.

We turn now to a description of slitter apparatus 30, as shown in FIGS. 2-5.

Slitter apparatus 30 includes a unique intermeshing disk configuration, including recesses 36 on the sides of disks 34 and flexible spacers 38 between disks 34. Slitter apparatus 30 has two sets of disks attached to parallel rotating shafts positioned such that the disk sets intermesh near their edges.

Figure 2:
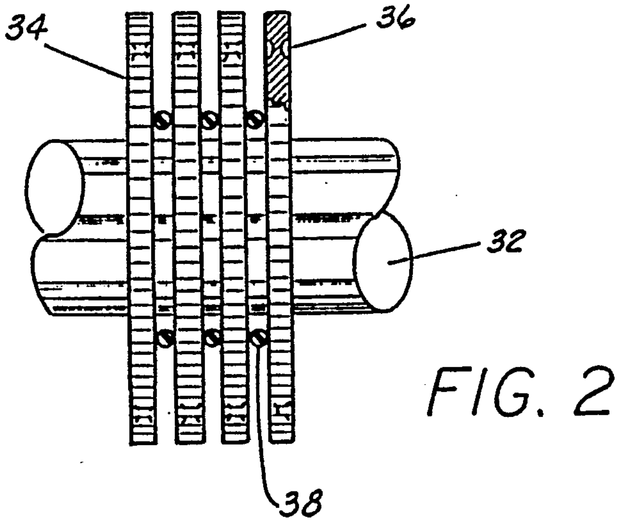
FIG. 2 is a partly-sectional radial view of one rotating cylindrical disk assembly in accordance with this invention, such view showing a reduced number of disks and spacers to better illustrate features of the invention.

As best shown in FIG. 2, each disk 34 is attached to shaft 32, which extends therethrough, and is spaced apart from an adjacent disk by spacer 38. Recesses 36 on each side of disk 34 allow disks from the other disk set to intermesh and provide the improved slitting action of this invention.

Figure 3:
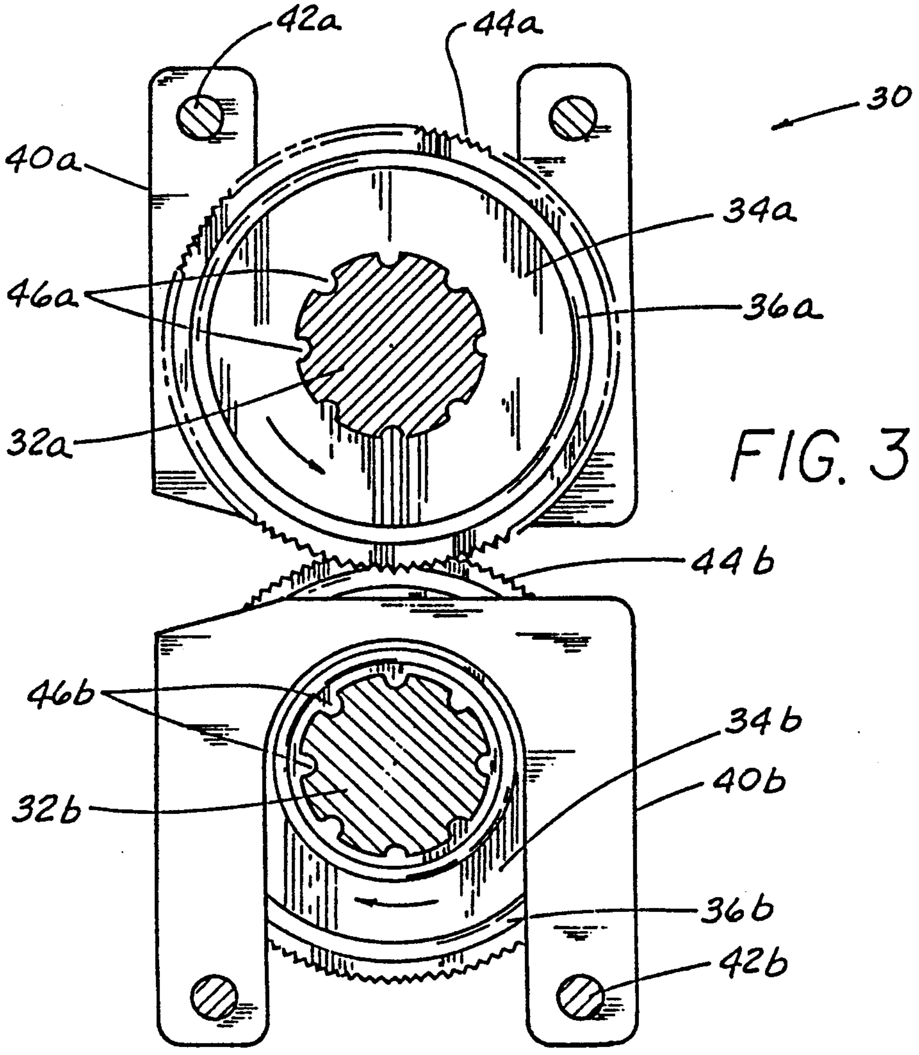
FIG. 3 is a cross-sectional axial view of a pair of cylindrical assemblies with their intermeshing disks.

As shown in FIG. 3, combs **40*a* and 40*b* are positioned between disks 34*a* and 34*b*, respectively. Comb support rods 42*a* and 42*b* position and secure combs 40 such that slit rind does not interfere with shafts 32*a*** and 32b. Disks 34a and 34b are keyed to shafts 32a and 32b by way of splines 46a and 46b, respectively. Disks 34a and 34b have knurled edges 44a and 44b, respectively.

Figure 4:
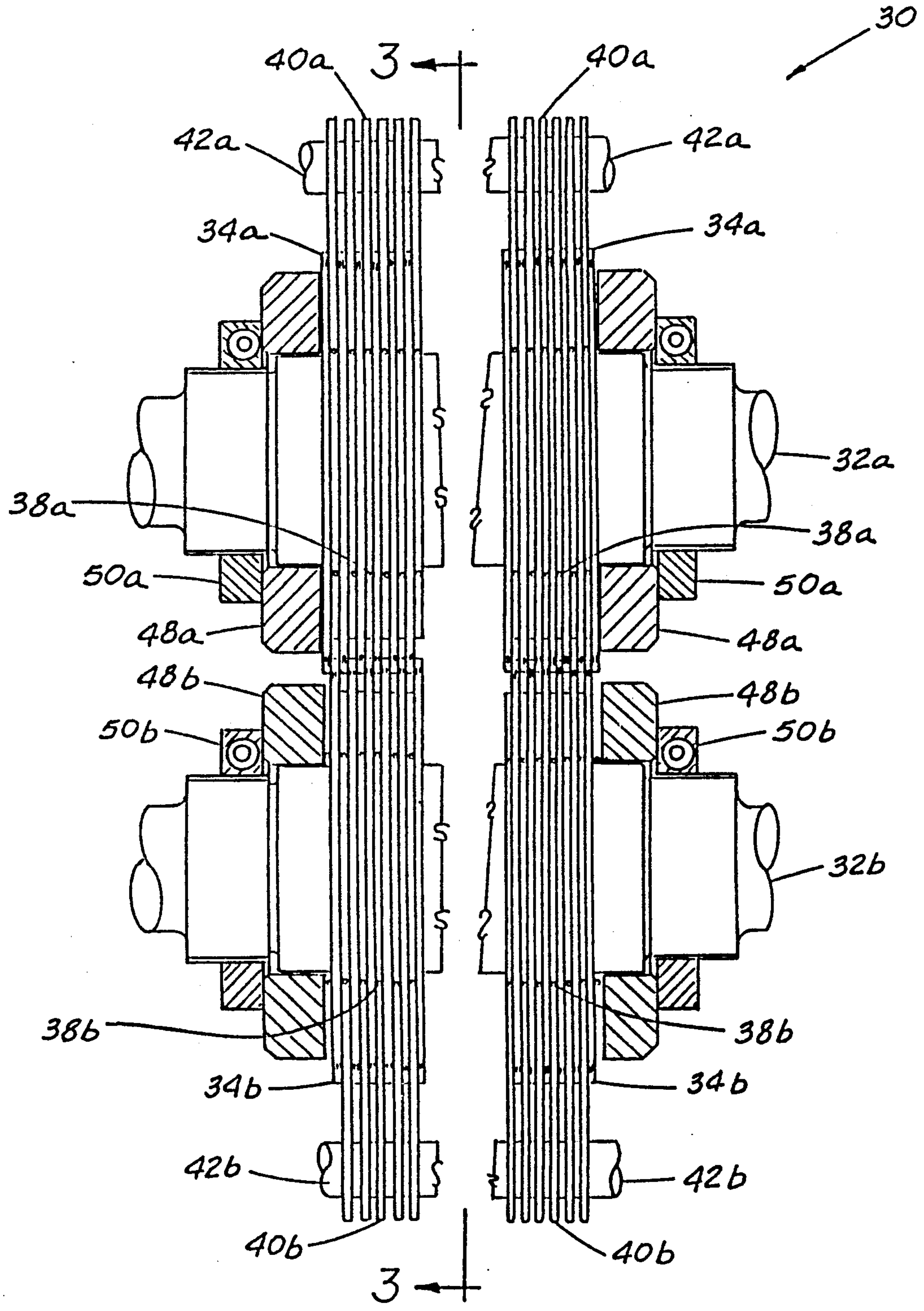
FIG. 4 is a partially-sectional radial view of an the apparatus of FIG. 3.

As best shown in FIG. 4, disks 34a and 34b are secured on shafts 32a and 32b by a disk-locator collar and locknut combination 48a/50a and 48b/50b, respectively. As disks wear axially, disk-locator collars 48a and 48b and locknuts 50a and 50b may compress the disks and spacers to maintain efficient slitting. Such adjustment is easily accomplished.

Figure 5:
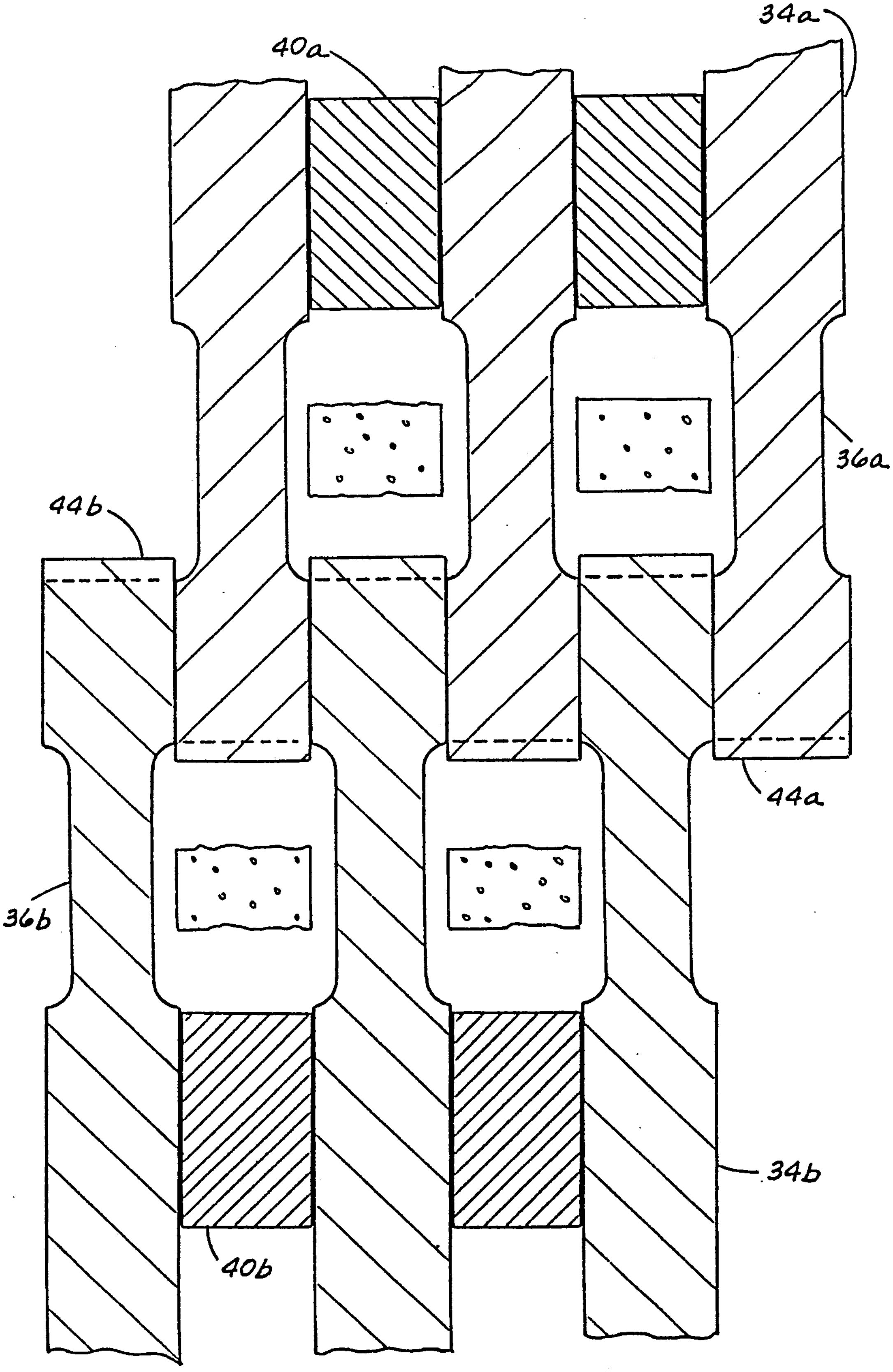
FIG. 5 is an enlarged fragmentary sectional view of the intermeshing disks.

As best shown in FIG. 5, sugarcane rind is slit into widths equal to the non-recessed width of each disk 34. Combs 40 prevent slit rind from accumulating between the disks, where they could interfere with slitting operations. Recesses 36a and 36b on disks 34a and 34b, respectively, have radial dimensions which accommodate rind of varying thicknesses. The knurled edges on each set of disks 44a and 44b, respectively, act to grip the rind and pull it through intermeshing disks 34a and 34b.

Disks 34 are preferably made of hard metals, while combs 40 may be made using a variety of softer materials, such as brass. Spacers 38 may be made using a variety of flexible, resilient materials, preferred materials including flexible silicones and rubber. Acceptable material choices will be apparent to those skilled in the art who are made aware of this invention.

In certain preferred embodiments, disk recesses 36 are dimensioned such that the resulting rind slits have a width of about 2.38 millimeters. Preferably, both sides of disks 34 are recessed axially about 0.38 millimeters. Preferably, such recesses begin about 0.38 millimeters from the peripheral edge of each disk and extend radially-inwardly about 4.75 millimeters therefrom.

Figure 6:
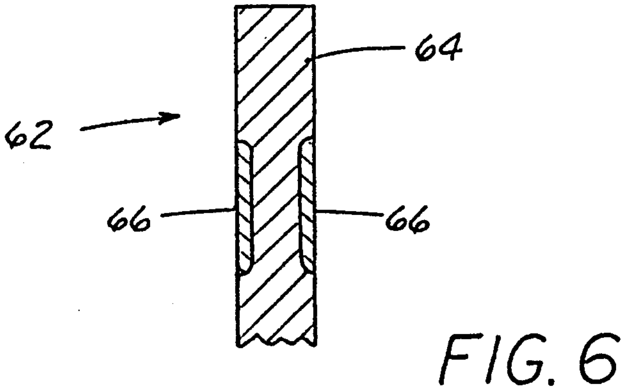
FIG. 6 is a fragmentary somewhat less enlarged sectional view of a single intermeshing disk, showing a variation of the invention.

FIG. 6 illustrates a preferred form of recesses in a disk 64. Disk 64, as with all disks, is preferably made of hard metal and has recesses formed by such hard metal. However, in this case the recesses are filled in by a soft metal portions 66 made, for example, of brass. This prevents any collection or jamming of debris in recesses, while still allowing self-sharpening of disks and other advantages of this invention.

Figure 7:
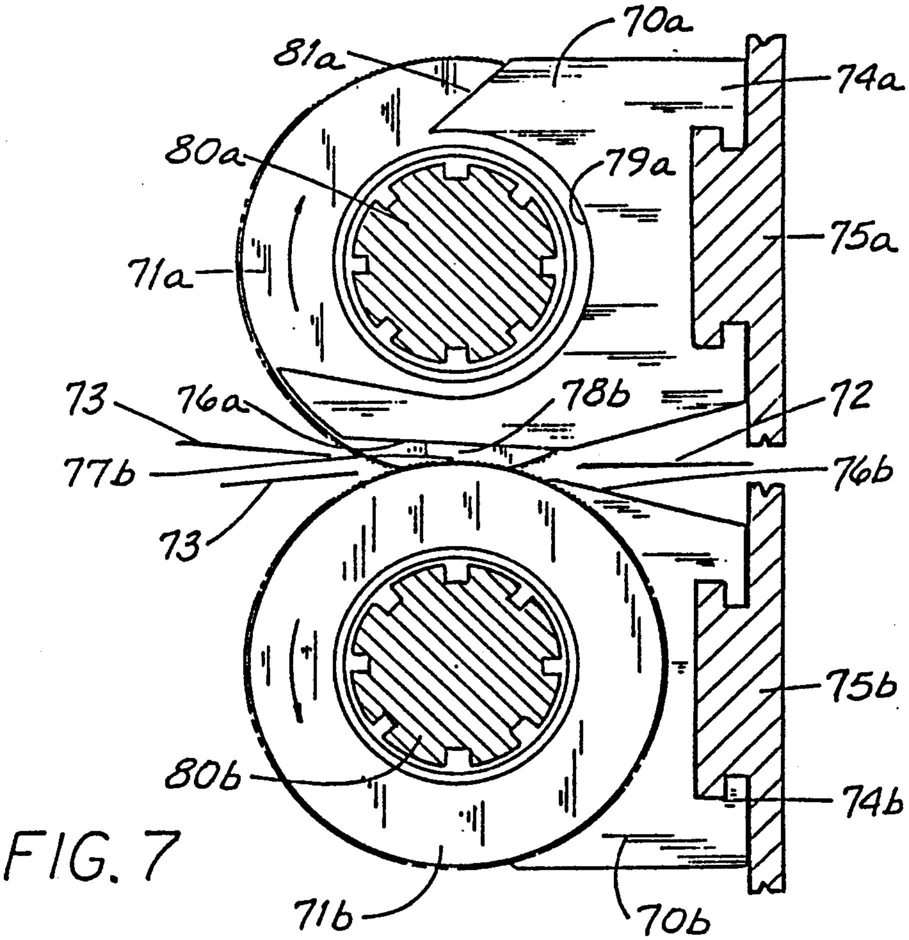
FIG. 7 is a cross-sectional axial view, as in FIG. 3, but illustrating another embodiment of the invention.

FIG. 7 illustrates a highly preferred form of fixed comb members which is an alternative to the form shown in FIGS. 3 and 4. Comb members 70a of the apparatus of FIG. 7 extend between disks 71a along shaft 80a, and comb members 70b extend between disks 71b along shaft 80b. Comb members 70a and 70b have mounting portions 74a and 74b which are secured to stationary members 75a and 75b, respectively, beside each of the cylindrical assemblies.

Comb members 70a and 70b have opposed guide edges 76a and 76b, respectively. Comb member 70a and its guide edge 76a are at the same axial position as disk 71b. The position of comb member 70a is such that guide edge 76a is radially beyond and adjacent to periphery 77b of disk 71b. Thus, strand passageway 78b is formed between periphery 77b and guide edge 76a. Similar passageways are formed by each disk and the corresponding comb member beyond its periphery.

Guide edges 76a and 76b guide flattened rinds 72 as they enter the slitting apparatus and narrow strands 73 as they exit the slitting apparatus through the passageways mentioned above.

Other important characteristics of such comb members will be described by further reference to comb member 70a in FIG. 7. Comb member 70a extends from stationary member 75a to an arcuate inner edge 79a between a pair of adjacent disks. Inner edge 79a is adjacent to and partially around shaft 80a on which such two adjacent disks are mounted. Inner edge 79a faces away from stationary member 75a and leaves one side of the cylindrical assembly open. This facilitates clearing of debris and introduction of air or water for cleaning purposes.

Comb member 70a also has transverse edge 81a which extends from comb inner edge 79a radially outwardly at an off-radius angle to form an outwardly-directed ramp against which debris is driven by disk rotation. This facilitates automatic removal of debris from between such two disks; debris collecting between disks may be carried with the disks until it hits transverse edge 81a and then rides along edge 81a until it exits the assembly.

This invention has been described in connection with a sugarcane rind slitting apparatus. However, the invention has applications beyond those described above, including but not limited to slitting other woody rinds such as that derived from sweet sorghum.

While the principles of this invention have been described in connection with specific embodiments, it should be understood clearly that these descriptions are made only by way of example and are not intended to limit the scope of the invention.

I claim:

1. An apparatus for slitting flattened depithed sugarcane or sorghum half-billet rinds into strands comprising:

a pair of counter-rotatable cylindrical assemblies each having: a shaft; a multiplicity of disks along the shaft intermeshing with the disks of the other cylindrical assembly, each disk having a periphery and each each disk being between and in face-to-face contact contact with two adjacent disks of the other cylindrical assembly near such periphery; and flexible spacers on the shaft to space the disks therealong;

means on the shafts to tighten the disks and flexible spacer means in an axial direction along the shafts for axial adjustment;

a stationary member beside each of the cylindrical assemblies; and for each individual disk on each shaft, a fixed comb member extending between the two adjacent disks on the other shaft, the comb member having a guide edge between such two disks in position radially beyond and adjacent to the periphery of said individual disk to form a strand passageway between such two disks, the comb member having a mounting portion secured to one of the stationary members.

2. The apparatus of claim 1 wherein each comb member extends from the stationary member to a comb inner edge between such two disks and adjacent to and partially around the shaft on which such two disks are mounted, such inner edge facing away from the stationary member to leave one side of the cylindrical assembly open, thereby to facilitate clearing of debris and introduction of fluids.

3. The apparatus of claim 2 wherein each comb member includes a transverse edge extending from the comb inner edge radially outwardly at an off-radius angle to form an outwardly-directed ramp against which debris is driven by disk rotation, thereby to facilitate automatic removal of debris from between such two disks.

4. The apparatus of claim L wherein each of the disks has two sides, the sides being axially recessed beginning at a radial position spaced from the periphery of such disk by a distance less than the radial extent of intermeshing overlap, such recessing extending radially inwardly at least to a position spaced from the periphery by a distance greater than the radial extent of intermeshing overlap.

5. The apparatus of claim 4 wherein the axial dimension of the recessing is substantially greater than thicknesses of sugarcane rind, whereby clearing of slit rind from between the disks is facilitated.

6. The apparatus of claim 4 wherein the disks are of hard metal and the recessing is filled by a softer metal thereby to prevent rind pieces from entering the recessing.

7. The apparatus of claim 4 wherein each comb member extends from the stationary member to a comb inner edge between such two disks and adjacent to and partially around the shaft on which such two disks are mounted, such inner edge facing away from the stationary member to leave one side of the cylindrical assembly open, thereby to facilitate clearing of debris and introduction of fluids.

8. The apparatus of claim 7 wherein each comb member includes a transverse edge extending from the comb inner edge radially outwardly at an off-radius angle to form an outwardly-directed ramp against which debris is driven by disk rotation, thereby to facilitate automatic removal of debris from between such two disks.

9. The apparatus of claim 1 wherein each flexible spacer has an uncompressed axial dimension greater than the axial dimension of the periphery of the disk received between the disks on either side of such spacer.

10. The apparatus of claim 1 wherein each of the shafts is splined therearound and the disks on it are configured to mate with the splines, whereby disk cocking is avoided.

* * * * *